(12) United States Patent
Kumar et al.

(10) Patent No.: US 6,317,575 B1
(45) Date of Patent: Nov. 13, 2001

(54) FIRM INTERLOCK BETWEEN SHAFT AND BORE

(75) Inventors: Ajay Kumar, Fairport; Dhirendra C. Damji, Webster, both of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/637,371

(22) Filed: Aug. 15, 2000

(51) Int. Cl.[7] .................. G03G 15/00; G03G 15/08
(52) U.S. Cl. .................. 399/267; 399/90; 399/119; 439/843
(58) Field of Search .................. 399/265, 267, 399/90, 159, 167, 111, 117, 119, 279; 439/843, 345, 352

(56) References Cited

U.S. PATENT DOCUMENTS 5,583,473 * 12/1996 Yamashita .................. 399/267 X
5,768,658 * 6/1998 Watanabe et al. .................. 399/111
5,822,654 * 10/1998 Damji et al. .................. 399/111

* cited by examiner

Primary Examiner—Sophia S. Chen
(74) Attorney, Agent, or Firm—Perman & Green, LLP

(57) ABSTRACT

Method for producing a firm, motion-resistant connection between mating surfaces of a male member, such as a shaft or hub, and a female member such as a bore. One or more thin ribs of pressure-deformable composition, such as integral soft metal or plastic, are formed on one of the mating surfaces, which ribs deform and spread between the surfaces when the male member is forced into the bore to connect the members. According to a preferred embodiment, the shaft is the fixed core shaft of a xerographic toner developer roller within a toner cartridge and/or the hub of a bearing support member for the shaft, and the bore is a central core shaft-engaging bore in the hub and/or a hub-engaging bore in the cartridge housing, and the connection is an electroconducting connection providing near-zero capacitance.

15 Claims, 4 Drawing Sheets

FIRM INTERLOCK BETWEEN SHAFT AND BORE

BACKGROUND OF THE INVENTION

Field of the Invention

The present invention relates to providing a firm interlock between a journal end, such as of a core or hub or shaft, and the bore on an element to be fixed to the journal end in a manner which prevents relative rotation therebetween. Known systems include the use of one or more mating flats ribs or other features on the outer surface of the journal end and on the inner surface of the bore, which prevent relative rotation and provide positive alignment. However such known systems are unsatisfactory for use in some precision apparatus systems which require a firm interlock between a journal end such as a shaft having a flat and an element having a bore having a flat which mates with the flat on the shaft, where any degree of "sloppiness" or relative movement is detrimental to the operation of the apparatus, resulting in extensive failures.

Reference is made to our U.S. Pat. No. 5,822,654, the entire disclosure of which is hereby incorporated herein by reference thereto. U.S. Pat. No. 5,822,654 discloses an electrostatographic reproduction machine which incorporates a customer-replaceable developer unit (CRU) or developer cartridge. Said unit has a fixed housing, an opposed pair of bearing support elements and a developer roll sleeve which is supported by the bearing support elements for rotation about a non-rotating central core member containing magnetic poles which are angularly positioned to provide an optimum magnetic field array for the proper development of toner images formed on the developer roll. The bearing support elements each have an end sleeve portion having an outer surface provided with a flat for mating with a flat in a receiving bore on the housing, and also having an inner bore surface having a flat for mating with a flat on the journal end of the central magnet core of the developer roll. The bearing support elements rotatably support the developer roll sleeve while the central core is fixed to the bearing support elements which are fixed to the housing. An electrical bias must be applied to the outer surface of the rotating developer sleeve to provide for proper development and control of the charged surface, and therefore the bearing support elements are electrically conductive and in contact with a power source through their connection with the housing/with near zero capacitance.

The central core of the fixed magnetic developer roll contains a plurality of spaced and aligned magnets having developer transport poles and trim poles which are angularly positioned to impart optimum magnetic field properties to the rotating developer roll sleeve, spaced therefrom for the proper development of the marking particles formed on the developer sleeve for transfer to the charged areas of the photoreceptor roll. Any relative movement between the fixed location or position of the magnet-containing core and the housing of the developer cartridge will change the location of the magnetic field imparted or induced to the surface of the developer sleeve and will result in improper development of the marking particles, which contain magnetic carrier particles and fusible toner particles, and external damage to the apparatus. It has been found that the use of mating flats on the central core shaft and the inner bore of the bearing support member, and mating flats on the outer hub of the bearing support member and on the supporting bore of the housing do not provide complete resistance to relative movement of either the central core or the bearing support element, i.e., they provide "sloppy" connections which reduce the quality of the electrostatic copies by producing prints which are light and non-uniform.

Firm motion-resistant connections between shafts and hub bores having rotation-resisting mating flats is also desirable in numerous devices, particularly scientific measurement or indexing devices, where even the slightest degree of "sloppiness" resulting in the slightest degree of "give" or relative movement can be detrimental to the accurate operation of the device. It is known to provide a hub with a radial locking screw, through its flat, which engages the mating flat on the shaft in order to tighten the connection therebetween but this is not always completely effective, nor is it possible with all assemblies such as that of U.S. Pat. No. 5,822,654.

SUMMARY OF THE INVENTION

The present invention relates to providing a firm, motion-resistant interlock between a mating journal end or shaft and a bore, each having one or more flats which mate with a corresponding number of flats on the other to prevent relative rotation therebetween. The invention is characterized by forming on the inner surface of the bore or on the outer surface of the journal end or shaft a plurality of axial "crush ribs" or thin, spaced elevations of relatively soft metal or plastic composition, which ribs are crushable or spreadable over their supporting surface under the pressure applied when the shaft is forced into the bore. The soft metal or plastic which is displaced from the crushed ribs spreads in all directions to fill any airspace between the shaft and the bore as the shaft is seated within the bore, to form a firm interlock which resists any degree of relative rotation or "sloppiness" between the parts, while any excess displaced material is ejected.

DETAILED DESCRIPTION OF THE PREFERRED EMBODIMENT

Figure 1:
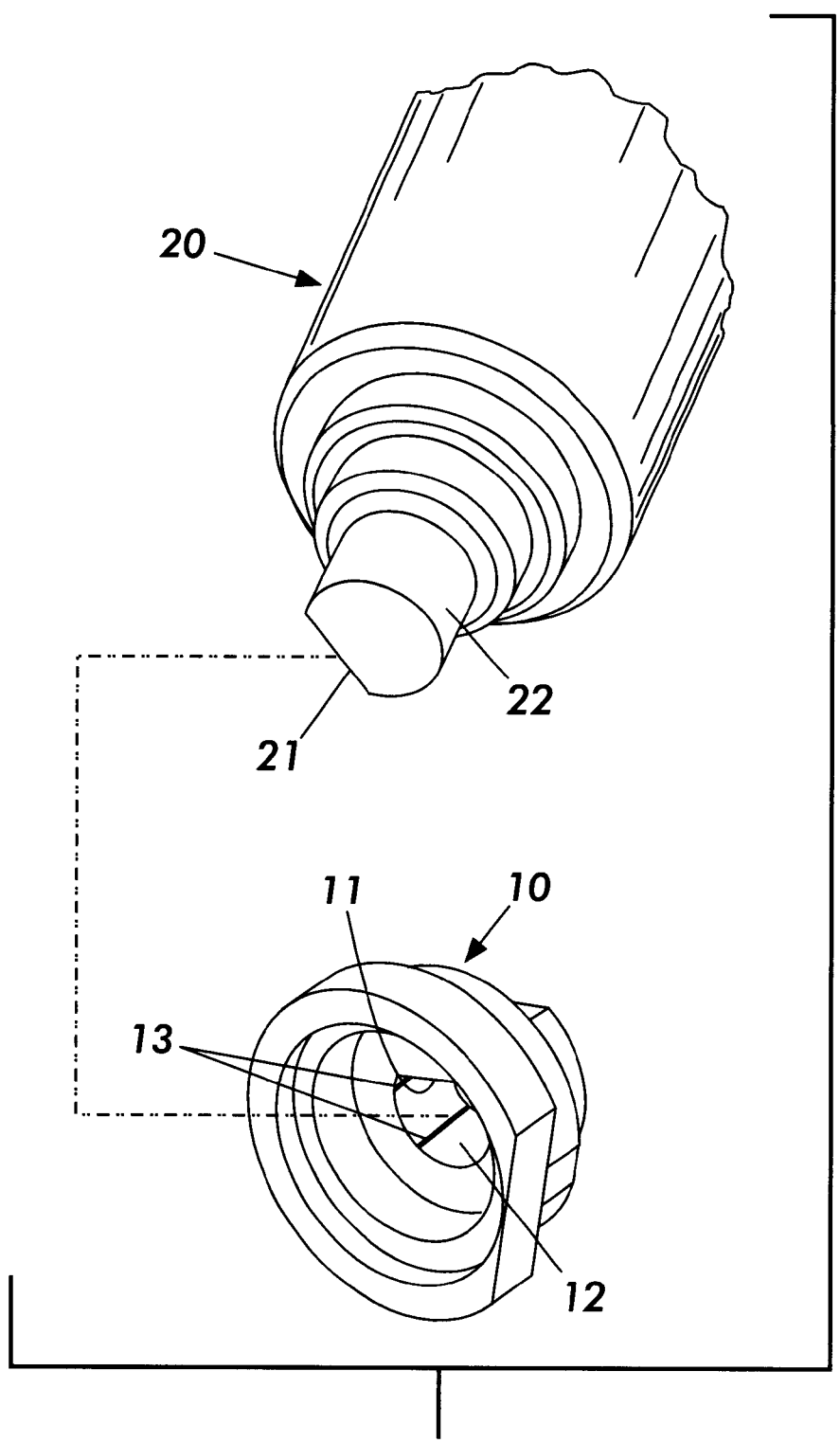
FIG. 1 is a perspective view of an end of a magnetic roll assembly and a bearing support member or end cap, with the latter shown in spaced and inverted position for purposes of illustration.

Referring to FIG. 1, the bearing or cap element 10 and the journal or shaft element 22 of the magnetic roll assembly 20 are provided with single mating flats 11 and 21, respectively, which serve as locating members and fix the orientation of elements 10 and 20 relative to each other. This is critically important for certain assemblies such as the bearing supports and developer roll core shafts of U.S. Pat. No. 5,822,654, the disclosure of which is incorporated herein.

The inner central hub of the bearing element 10 has a bore surface 12 containing the location flat 11 and a plurality of spaced crush ribs 13 of relatively soft, spreadable metal or plastic composition which preferably is integral with the material of which the hub element is formed. For ease of manufacture, the ribs 13 are axial in direction and are formed when the bore surface 12 is molded or otherwise formed on the hub. However if the hub element 10 is formed by molding, the ribs 13 may be slightly spiral along the bore surface 12 so that they spread uniformly over the surface of the bore as they are pressure-crushed. Also the ribs 13, if molded, preferably are gradually tapered from adjacent the inlet end of the bore surface 12, or inwardly therefrom, for ease of insertion or introduction of the leading end of the shaft 20. It should be understood that, while the crush ribs 13 generally are located on the inner surface 12 of the bore since a shaft 20 is commonly formed of a hard steel alloy for strength purposes, the crush ribs can be present on the outer surface of the shaft 20 rather than on the bore surface if the hub and shaft are formed of the same material, or where the hub element is formed of harder, less crushable or deformable material. Since the hub bore 12 and the shaft 20, are usually machined and cut or molded to the closest possible tolerances, the dimensions of the crush ribs 13, and their number, are usually as small as possible, while producing the desired result of spreading the mating surfaces to fill any airspace between the assembled hub and shaft and produce a tight connection which prevents any slight relative movement therebetween. Thus, the crush ribs 13 generally are very thin, with a maximum height which varies between about 0.0001 and 0.001 inch, depending upon the mating diameters of the bore 12 and the shaft 20. The thickness or width of the ribs 13 is less critical since they spread over surfaces of the bore and the shaft.

A critical use of the present crush ribs is in connection with the support of a magnetic developer roll within a user-replaceable toner cartridge of an electrostatic reproduction machine, where the magnetic developer roll comprises a non-rotatable magnetic core and a rotatable developer sleeve, as disclosed in U.S. Pat. No. 5,822,654 and illustrated by FIGS. 3 and 4 of the present application.

Figure 2:
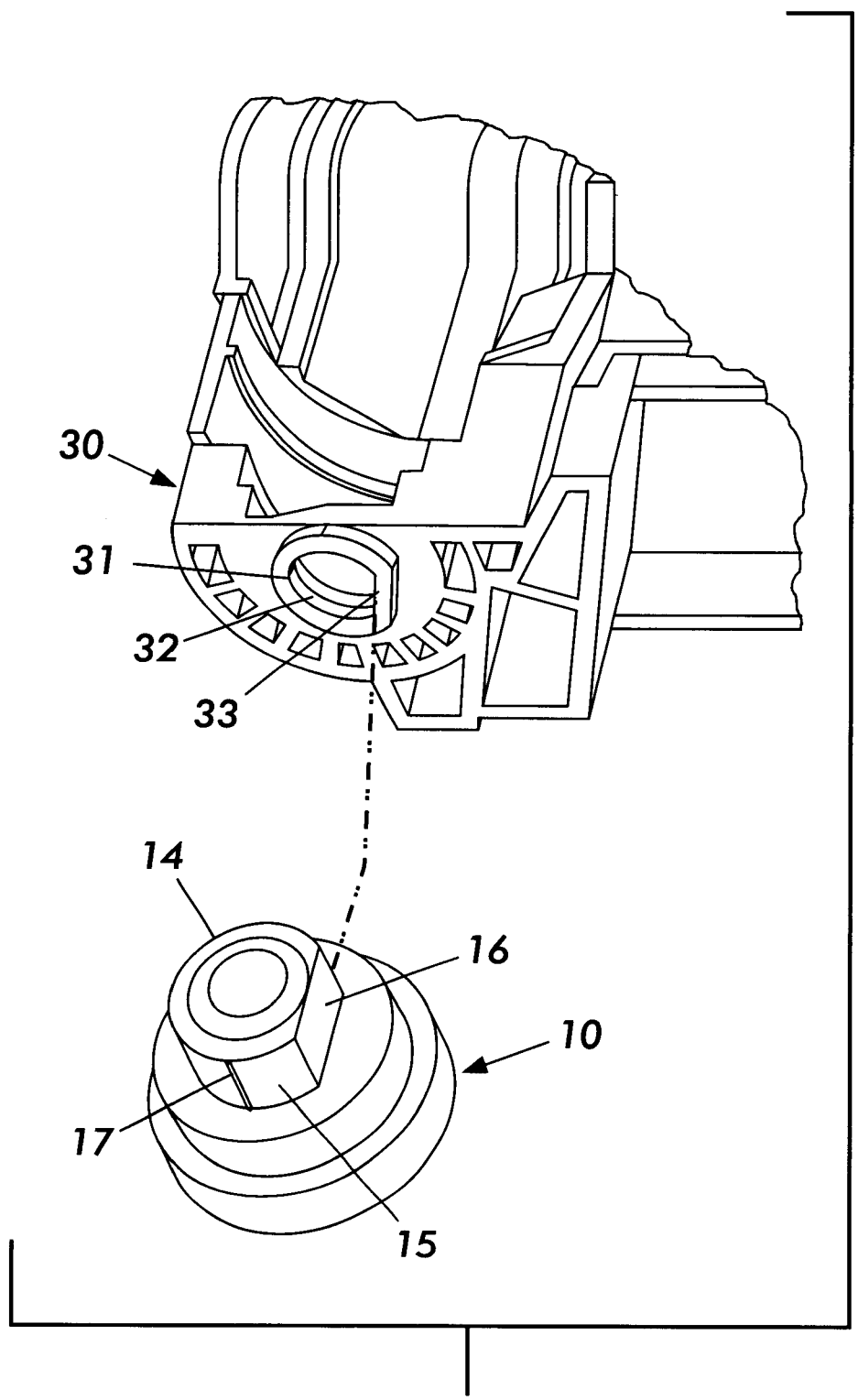
FIG. 2 is a perspective view of an end of a cartridge housing and a bearing support member or end cap, with the latter shown outside the housing for purposes of illustration.

As illustrated by FIG. 2, the bearing element 10 also has an outer male cap member 14 having a surface 15 containing a location flat 16 and a plurality of spaced crush ribs 17 of relatively soft, spreadable metal or plastic composition which preferably is integral with the material of which the bearing element 10 is formed.

Figure 4:
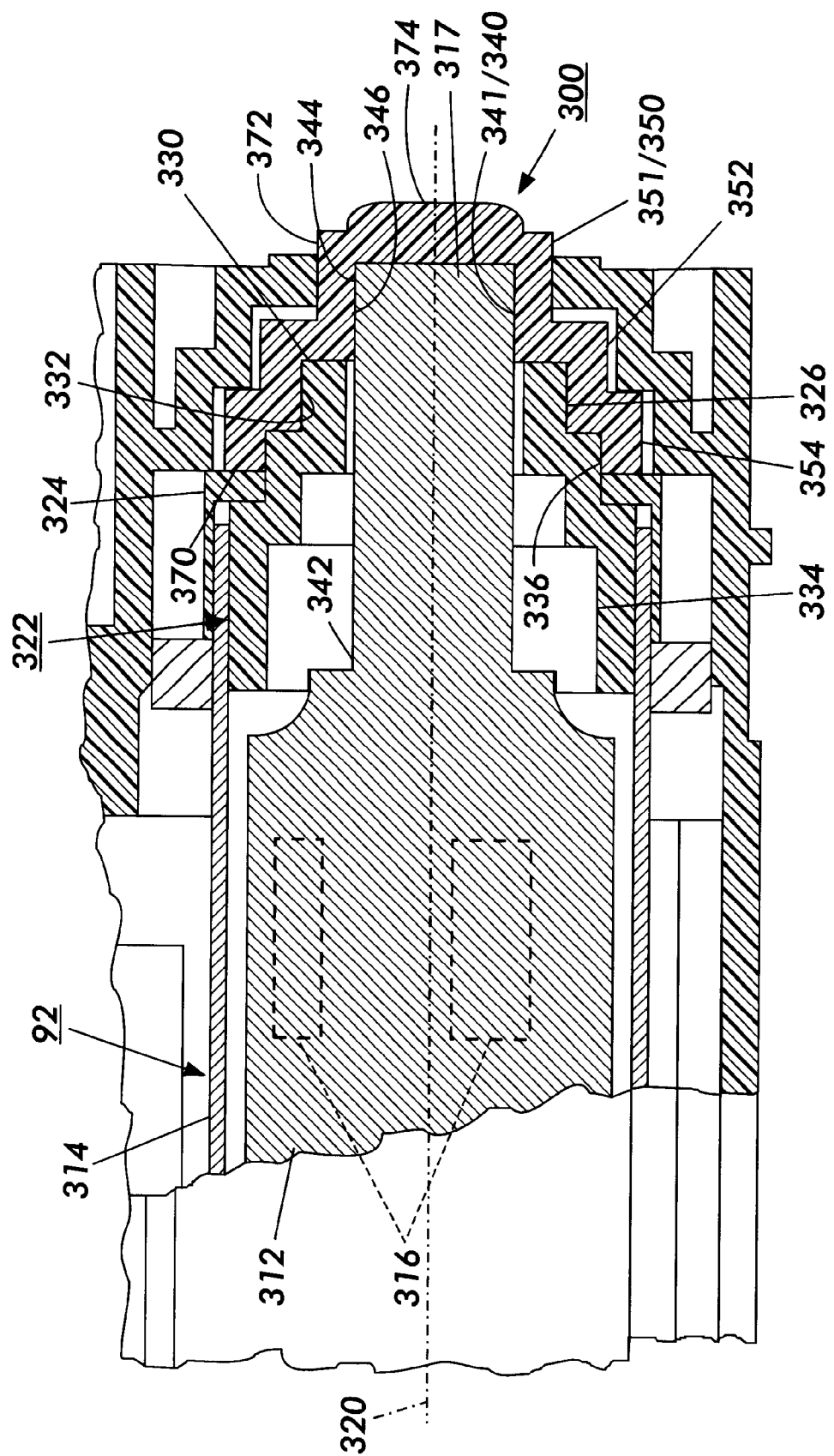
FIG. 4 is a cross sectional view of FIG. 3 along the line 4—4 thereof.

As shown by FIG. 4, the bearing element 10 of FIG. 1 is inverted and the inner central hub bore surface 12 is forced over the shaft 22 to mate the flats 11 and 21 and spread the crush ribs 13 to produce a magnetic roll assembly having a firm, motion-resistant connection between the magnetic roll member 20 and the bearing support element 10.

Next, the assembly is inserted within the cartridge housing 30 having a bore 31 with a surface 32 having a locating flat 33 designed to mate with the flat 16 on the surface 15 of the outer male cap member 14 of the bearing element when the cap member 14 is forced into the housing bore 31. This causes the crush ribs 17 to spread between the surfaces 15 and 32 to form a tight, movement-resistant connection between the magnetic roll assembly and the housing 30 of the cartridge.

Figure 3:
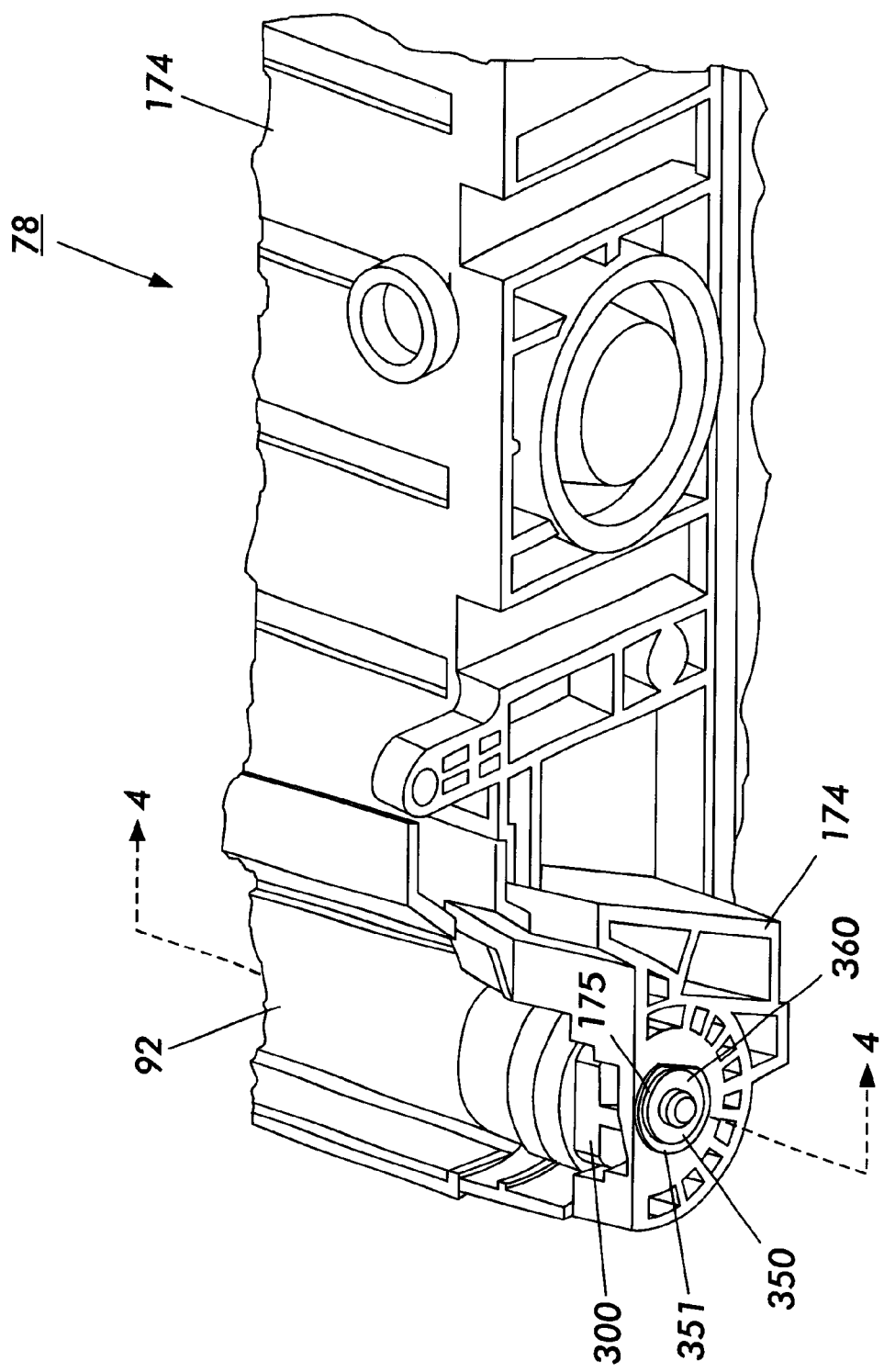
FIG. 3 is a partial perspective view of a developer cartridge, developer roll and bearing support incorporating crush ribs according to the present invention.

For clarity and ease of discussion, present FIGS. 3 and 4 use the same reference numbers for the same elements shown in corresponding FIGS. 8 and 9 of U.S. Pat. No. 5,822,650, the disclosure of which is incorporated herein by reference.

Referring to present FIGS. 3 and 4, the developer subassembly 78 of the customer-replaceable toner cartridge unit (CRU) comprises a housing 174, a developer roll 92 having a stationary magnetic core 312 and a rotatable developer sleeve 314 both supported by a bearing support member 300 which is non-rotatably attached to the cartridge housing 174 and which non-rotatably supports the magnetic core 312. The core 312 contains magnet assemblies 316 having pickup poles which are aligned to cause the developer sleeve 314 to attract toner and carrier beads thereto, transport poles which are aligned to maintain the carrier beads adhered to the roll sleeve 314, and trim poles which are aligned to cause a trim blade to trim and regulate the amount of developer passing to the development zone. The precise locations of the magnetic assemblies 316 on the stationary core 312, relative to the developer sleeve 314 control the magnetic fields at the surface of the sleeve and the attraction, trim, and transfer of the developer composition, which determine the quality of the developed images which are transferred to a copy sheet and fused.

Therefore it is important to the quality of copies produced by means of the CRU cartridges of U.S. Pat. No. 5,822,654 that there is no relative movement, or sloppiness, between the stationary developer core 312 and the bearing support member 300, as shown by FIG. 1, or between the latter and the cartridge housing 174 as shown by FIG. 2. To this end, the present invention involves providing the bearing support member 300 with a plurality of spaced crush ribs 341 extending axially along the bore 340 of the bearing support member 300 which engages the mating end 317 of the developer core 312. Core end 317 also includes a flat 344 which mates with a flat 346 within the bore 340 which prevents relative rotation therebetween. The forcing of the bearing support member bore 340 over the end 317 of the core shaft, during initial assembly of the parts, deforms, crushes and spreads the crush ribs 341 within the bore 340 to form a tight, motion-resistant connection between the developer core 312 and the bearing support member 300. The connection between the bearing support member 300 and the cartridge housing 174 is similarly tightened by providing a spaced plurality of crush ribs 351 on the outer hub surface 350 the bearing support member 300 which is engaged within a bore 175 in the housing 174. The outer surface 350 of the bearing support member 300 also includes a flat 356 which mates with a corresponding flat 360 in the housing bore 175 to fix the bearing support member 300 to the cartridge housing 174. When the bearing support member 300, and attached developer core 312, is forced into the housing bore 175 the crush ribs 351 on the outer hub surface 350 of the bearing support 300 are crushed, flattened and spread into the housing bore 175 to form a tight motion-resistant connection therebetween along both axial and angular axes.

The development roll 92, as shown in FIG. 4 includes a fixedly mounted core 312 and a sleeve 314 which is rotatably mounted around core 312 and a sleeve 314 which is rotatably mounted around core 312. The core 312 may be made of any suitable durable material which is magnetically conductive, for example, a metal or a magnetically conductive plastic. The core 312 includes magnetic poles 316 which are angularly positioned with respect to roll centerline 320. The poles 316 are so angularly positioned to provide an optimum magnetic field for the proper development of the marking particles.

The sleeve 314 is spaced from and rotatably mounted with respect to core 312. The sleeve 314 is made of preferably a magnetically non-conductive and an electrically conductive material. For example, the sleeve 314 may be made of aluminum. The development roll 92 also preferably includes an end cap 322 which is fixedly secured to sleeve 314 and rotates therewith. The sleeve end cap 322 may be made of any suitable durable electrically conductive material. For example, the end cap 322 may be made of conductive plastic.

To provide proper spacing between the developer roll 92 and the photoconductive surface of the photoreceptor (not shown), the developer roll 92 preferably further includes a development roll sleeve or (DSR) sleeve 324. The DSR sleeve 324 has a thickness which sets the gap between the developer roll 92 and the photoconductive surface. The DSR sleeve 324 is fixedly secured to the sleeve 314 and rotates therewith. Thus, the DSR sleeve 324 is in rolling contact with the photoconductor surface of the photoconductive drum.

The conductive bearing support 300 includes a first feature 326 which cooperates with the development roll 92. The first feature 326 may be in any form capable of providing support to the development roll 92. For example, the first feature 326 may be in the form of a journal or a bore cooperating with a mating feature on the development roll 92.

While the development roll may be in the form of a single rotating component, preferably, as shown in FIG. 3 the development roll includes the stationary core 312 as well as the rotating sleeve 314. The first feature 326 provides for the rotation of the sleeve end cap 322 which is a part of the development roll 92. The sleeve end cap 322 rotates relative to the conductive bearing support 300.

As shown in FIG. 4, the sleeve end cap 322 includes an inner hub 330 which mates with middle bore 332 of conductive bearing support 300. Further, as shown in FIG. 4, the sleeve end cap 322 may include a lager hub 334 which matingly fits with large bore 336 of conductive bearing support 300.

The core 312 is positioned fixedly to housing 174 by small bore 340 of the support 300 which matingly fits with journal diameter 342 of the core 312. Preferably, to angularly orient the poles 316 in the core 312 of the development roll 92, the journal 342 of the core 312 of the development roll 92 includes a flat 344 which mates with flat 346 within bore 340 of the support bearing 300.

According to the present invention, a firm motion-resistant interlock is provided between the magnetic core 312 and the inner central bore 340 of the support bearing 300 by providing the inner surface of the bore 340 with a spaced plurality of axial crush ribs 341, such as thin raised plastic ribs which are integral with the plastic support bearing 300 and are formed when the bore 340 is formed in the bearing 300. The ribs 341 are crushed and spread when the journal end of the core shaft 312 is forced into the bore 340, resulting in a tight, motion-resistant interlock therebetween.

The conductive bearing support 300 also is fixedly secured to the development housing 174. For example, as shown in FIG. 4, the bearing support 300 includes small OD 350, medium OD 352, and large OD 354 which mate with corresponding bores in the housing 174. It should be appreciated that the middle OD 352, and large OD 354 may be either in clearance or matingly fitted to the respective bore of the housing.

Referring again to FIG. 3 to angularly orient the conductive bearing support 300 with respect to the housing 174, preferably, the bearing support 300 includes a locating feature in the form of a flat 356 formed from small OD 350. Correspondingly the bore in housing 174 includes a flat 360 which mates with flat 356 of the conductive bearing support 300. The flat 360 on the bore of housing 174, the flat 356 on the exterior of the support 300, the flat 344 on the interior bore of the support 300, and the flat 332 on core 312 cooperate to angularly orient the poles of the core 312.

As between the core shaft 312 and the bearing support 300, another tight motion-resistant interlock is provided between the bearing support 300 and the cartridge housing 174, according to the present invention, by forming a spaced plurality of raised axial crush ribs 351 on the OD surface 350 of the central outer hub 372 of the bearing support 300, which ribs are crushed and spread when the central hub of support 300 is forced into the housing bore 174. Ribs 351 preferably are plastic ribs integral with the support 300.

Referring again to FIG. 4, preferably, the bearing support 300 further includes an outer end face 370 which contacts and restrains the development roll spacing sleeve 324 between the sleeve 314 of the development roll 92 and the housing 300.

The conductive bearing support 300 further serves an important function by providing an electrical path from the power supply to the electrically conductive sleeve 314 of the roll 92. As shown in FIG. 4, the conductive bearing support 300 is in contact at large bore 336 and middle bore 332 with sleeve endcap 322. The sleeve endcap 322 is in electrical contact with the sleeve 314. The sleeve endcap 322 thus provides an electrical connection between the conductive bearing support 300 and the sleeve 314.

The conductive support 300 is made of any suitable durable material which is electrically conductive. The support thus can be made of a durable metal or, as shown in FIG. 4, be made of an electrically conductive plastic. For example, the support 300 may be made of a polycarbonate with carbon fibers or other conductive fiber.

The support 300 includes a feature 372 which extend outwardly from the development housing 174 and serves to provide an electrical path from the power source (not shown) to the development roll 92. For example, as shown in FIG. 4, the conductive bearing support 300 includes the central hub 372. The central hub 372 includes an outer face 374 which provides for the electrical contact for the development roll 92. The outer face 374 may be contacted with the power supply in any suitable fashion.

It should be understood that the above description is merely illustrative of the invention. Various alternatives and modifications can be devised by those skilled in the art without departing from this invention.

What is claimed is:

1. A method for producing a firm, motion-resistant connection between a male member and a female member having a mating bore, which comprises forming on the surface of one of said members at least one thin raised crush rib of solid pressure-deformable material, and pressing said male member into said mating bore to deform said raised rib and cause it to spread between said surfaces to fill any air space therebetween and produce a firm, motion-resistant connection between the connected members.

2. The method according to claim 1 in which the mating surfaces of said members also contain at least one locating element which mates with a locating element on the surface of the other to align the connected members.

3. The method according to claim 2 in which the locating elements comprise a single flat in the outer surface of the male member and a corresponding single flat on the inner surface of the bore.

4. The method according to claim 1 in which a plurality of said thin raised ribs are formed within the bore of said female member and/or on the surface of said male member.

5. The method according to claim 1 in which the male member is a shaft of a non-rotating magnetic core of a toner-developer roll having an outer rotating developer sleeve, and the female member is a bearing support member having a central bore for receiving said shaft.

6. The method according to claim 1 in which the male member is the outer surface of a hub of a developer roll support member, and the female member is a bore in a housing of a toner cartridge supporting said developer roll support member.

7. A method for producing a firm, motion-resistant connection between the end of a shaft of a non-rotating magnetic core of a toner-developer roll and a mating central bore of a bearing support member connected to a housing of a toner cartridge, which comprises forming on the inner surface of said bore a spaced plurality of thin raised ribs of solid, pressure-deformable material, and pressing the end of said shaft into said mating central bore to deform said spaced ribs and cause them to spread over the inner surface of said bore to fill any air space between the surfaces of the shaft and the bore to produce a firm, motion-resistant connection therebetween.

8. A member for producing a firm, motion-resistant connection between itself and a second member, one of said members being a male member having a shaft end and the other of said members being a female member having a bore for receiving and connecting to said shaft end, the outer surface of said shaft end or the inner surface of said bore being provided with at least one thin raised rib of solid, pressure-deformable material which is spread between said surfaces when said shaft is pressed into said bore, to produce a firm, motion-resistant connection between said members.

9. Members having a firm, motion-resistant connection therebetween, comprising a male member and a female member having a mating bore, the surface of one of said male and female members having at least one thin raised rib of solid pressure-deformable material which deforms when said male member is pressed into said mating bore to cause it to spread and to fill any air space therebetween and produce a firm, motion-resistant connection between the connected members.

10. Members according to claim 9 in which the mating surfaces of said male and female members also contain at least one locating element which mates with a locating element on the surface of the other to align the connected members.

11. Members according to claim 10 in which the locating elements comprise a single flat in the outer surface of the male member and a corresponding single flat on the inner surface of the bore.

12. Members according to claim 9 in which a plurality of said thin raised ribs are present within the bore of said female member and/or on the surface of said male member.

13. Members according to claim 9 in which the male member is a shaft of a non-rotating magnetic core of a toner-developer roll having an outer rotating developer sleeve, and the female member is a bearing support member having a central bore for receiving said shaft.

14. Members according to claim 9 in which the male member is the outer surface of a hub of a developer roll support member, and the female member is a bore in a housing of a toner cartridge supporting said developer roll support member.

15. Members having a firm, motion-resistant connection therebetween, comprising the end of a shaft of a non-rotating magnetic core of a toner-developer roll and a mating central bore of a bearing support member connected to the housing of a toner cartridge, the inner surface of said bore having a spaced plurality of thin raised crush ribs of solid, pressure-deformable material which deform when the end of said shaft is pressed into said mating central bore to cause said spaced ribs to spread over the inner surface of said bore to fill any air space between the surfaces of the shaft and the bore to produce a firm, motion-resistant connection therebetween.

* * * * *